Oct. 27, 1925.
S. G. WIGHT
LOCOMOTIVE CONSTRUCTION
Filed Oct. 17, 1923.
1,559,488
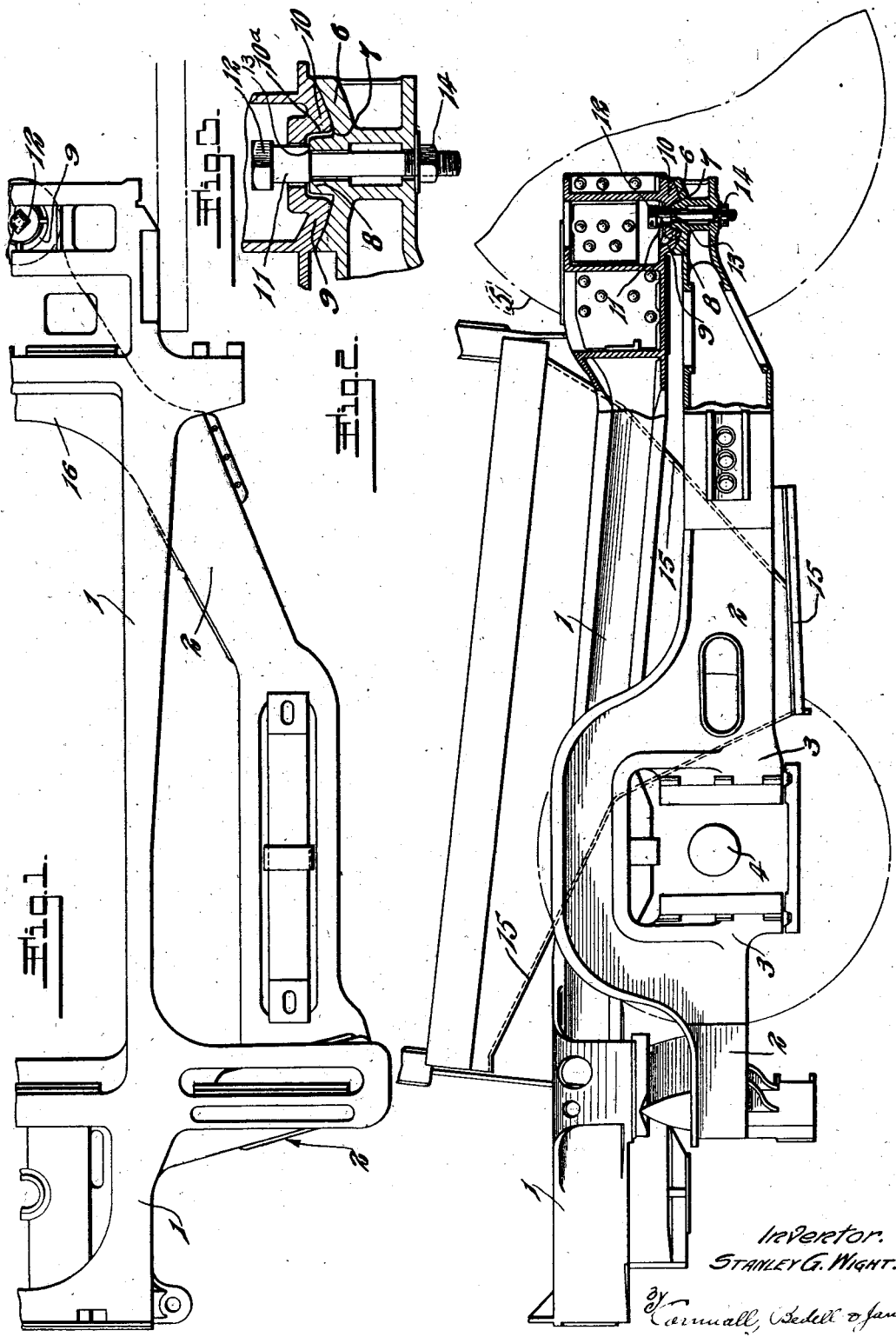
Inventor.
STANLEY G. WIGHT.
By Cannall, Bedell & James.
His Attorneys.

Patented Oct. 27, 1925.

1,559,488

UNITED STATES PATENT OFFICE.

STANLEY G. WIGHT, OF ST. LOUIS, MISSOURI, ASSIGNOR TO COMMONWEALTH STEEL COMPANY, OF ST. LOUIS, MISSOURI, A CORPORATION OF NEW JERSEY.

LOCOMOTIVE CONSTRUCTION.

Application filed October 17, 1923. Serial No. 668,990.

*To all whom it may concern:*

Be it known that I, STANLEY G. WIGHT, a citizen of the United States, residing at St. Louis, Missouri, have invented a certain new and useful Improvement in Locomotive Construction, of which the following is a specification, such as will enable others skilled in the art to which it appertains to make and use the same.

My invention relates to railroad rolling stock and consists in an improved locomotive cradle and trailer truck assembly.

In a familiar type of locomotives, the locomotive frame includes a cradle extending rearwardly of the locomotive drivers and supported near its rear end by a trailer truck, the frame of which is pivotally united with the cradle at its forward end. The fire box ash pan is located in such a manner that it extends into the horizontal planes occupied by the cradle frame and trailer truck frame and usually there is slight clearance at different points between the ash pan and these frame members, thus preventing any relative longitudinal or lateral movement of the truck and cradle without previous removal of the ash pan. The cradle and truck assemblies with which I am familiar have been of such nature that the trailer truck could only be disassembled from the locomotive frame by being moved longitudinally thereof for a substantial distance.

The object of my invention is to so assemble the trailer truck and cradle that the trailer truck may be removed from the locomotive without removal of the ash pan and without other interference between elements on the two units of the assembly which may be horizontally aligned with each other with very slight clearance between them.

Another object of my invention is to provide an improved center plate assembly especially designed for the assembly of a locomotive cradle and trailer truck but also adapted for use in other similar center plate assemblies.

In the accompanying drawings illustrating a selected embodiment of my invention,—

Figure 1 is a top view of a longitudinal half of a cradle and trailer truck.

Figure 2 is in part a side elevation and in part a longitudinal vertical section of the assembled cradle and truck.

Figure 3 is a detail of the center plates of the construction indicated in Figures 1 and 2.

The locomotive cradle is indicated at 1 and the trailer truck frame at 2. Preferably these elements are formed of separate one-piece castings but this is not essential to the embodiment of my invention.

It will be noted that the trailer truck frame includes pedestal portions 3 in which the trailer truck axle 4 is mounted. The rear end of the trailer truck supports the rear end of the cradle. The forward end of the cradle is connected to the main frame of the locomotive which is mounted upon the drivers, the rear driver being indicated at 5. The forward end of the trailer truck comprises converging members which terminate in a centrally located center plate 6. This center plate may be formed integrally with the truck frame and comprises an upwardly facing concave surface 7 in the center of which is a circular boss 8. The cradle is provided with a center plate 9, the downwardly convex portion 10 of which is adapted to fit the surface 7 of the truck center plate and is recessed as indicated at 10$^a$ to accommodate truck frame boss 8.

Center plates 6 and 9 are provided with a central vertical opening for the radius bar pin 11. This pin is in the form of a bolt having a head 12, the shank of the bolt being shouldered at 13 to engage the top of boss 8, the vertical opening in which is only large enough to receive the reduced portion of the bolt shank and thereby provides an engaging surface for shoulder 13. The end of the shank is threaded for a nut 14 in the usual manner. The unreduced portion of the bolt shank is long enough to hold the underface of the bolt head 12 a substantial distance above the upper face of center plate 9 and the vertical opening in the center plate 9 is somewhat larger than the diameter of the portion of the bolt passing therethrough.

The recess 10$^a$ for boss 8 is somewhat larger in diameter than the boss and this construction permits the trailer truck to pivot in a longitudinal plane as well as in a horizontal plane about the cradle. The construction described, however, permits the bolt to be rigidly secured to the truck center plate, thereby preventing rattling and wear due to looseness of the pin in the truck.

The locomotive ash pan is indicated at 15 and it will be noted that this pan extends downwardly through the cradle and trailer truck frame to a point adjacent the bottom of the latter. The forward portion of this ash pan is fairly close to the portion 16 of the trailer truck frame which unites the converging sides of the truck frame. It would be impossible to move the trailer truck rearwardly of the cradle without the portion 16 of the truck striking the ash pan. Unless the truck and cradle could be separated vertically it would be necessary to remove the ash pan from the cradle before disassembling the cradle and truck.

With the center plate construction described and illustrated, this relative vertical movement between the cradle and truck is permitted by removal of the pin and a substantial amount of labor and delay in repair work is thereby eliminated.

Obviously various modifications in the details of my invention may be made without departing from the spirit thereof as expressed in the appended claims.

I claim:

1. In a railroad vehicle, interengaging center plates and a removable center pin extending through said center plates and rigidly secured to one of said center plates and having limited longitudinal movement through the other of said center plates.

2. In a railroad vehicle, interengaging center plates, and a removable center pin extending through said center plates rigidly secured to one of said center plates and having longitudinal movement through the other of said center plates.

3. In a locomotive, a cradle frame, a trailer truck frame, a center plate on said cradle frame, a center plate on the extreme forward end of said truck frame, said center plates on said frames engaging each other, a bolt securing said center plates together, said center plates and the frames upon which they are mounted being separable from each other vertically upon removal of said bolt.

4. In a locomotive, a cradle including a center plate, a trailer truck including a center plate adapted to fit said cradle center plate, and a pivotal locking bolt, the shank of which is secured to one of said center plates and the head of which overhangs a head engaging shoulder on the other of said center plates but is spaced therefrom normally.

5. In a locomotive, a cradle including a downwardly facing center plate, a trailer truck including an upwardly facing center plate adapted to fit said cradle center plate, and a pivotal locking bolt having a shoulder spaced from its head and engaging the upper face of said truck center plate.

6. In a locomotive, a cradle, a trailer truck frame, a center plate on said cradle frame, a center plate on the extreme forward end of said truck frame, a center pin securing said center plates together, an ash pan carried by said cradle and extending into the horizontal plane occupied by said truck frame, said truck frame and cradle being separable upon removal of said pin without removal of said ash pan.

7. In a locomotive, a cradle, a center plate thereon, a trailer truck axle, a trailer truck frame carried on said axle with its rearwardly extending portion supporting said cradle, forwardly extending arms on said truck frame, a center plate carried by said arms and thrust upwardly against said cradle center plate by the load of said cradle on said rear portion, and a single element securing said center plates against vertical and longitudinal movement from each other to disassemble said cradle and truck.

In testimony whereof I hereunto affix my signature this 4th day of October, 1923.

STANLEY G. WIGHT